(12) United States Patent
Ichikawa et al.

(10) Patent No.: US 9,866,038 B2
(45) Date of Patent: Jan. 9, 2018

(54) WIRELESS POWER TRANSMISSION SYSTEM

(71) Applicant: Murata Manufacturing Co., Ltd., Nagaokakyo-shi, Kyoto-fu (JP)

(72) Inventors: Keiichi Ichikawa, Nagaokakyo (JP); Tsuyoshi Suesada, Nagaokakyo (JP); Hironori Sakai, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 340 days.

(21) Appl. No.: 14/858,078

(22) Filed: Sep. 18, 2015

(65) Prior Publication Data
US 2016/0006271 A1 Jan. 7, 2016

Related U.S. Application Data

(63) Continuation of application No. PCT/JP2014/056837, filed on Mar. 14, 2014.

(30) Foreign Application Priority Data

Mar. 19, 2013 (JP) ................................ 2013-056855
Feb. 21, 2014 (JP) ................................ 2014-031873

(51) Int. Cl.
*H04B 5/00* (2006.01)
*H02J 5/00* (2016.01)
(Continued)

(52) U.S. Cl.
CPC .............. *H02J 5/005* (2013.01); *H02J 7/025* (2013.01); *H02J 17/00* (2013.01); *H02J 50/05* (2016.02); *H04B 5/0012* (2013.01)

(58) Field of Classification Search
CPC .............................. H02J 50/05; H04B 5/0012
(Continued)

(56) References Cited

U.S. PATENT DOCUMENTS 8,907,526 B2 * 12/2014 Harakawa ............... H01F 38/14
307/104
9,741,487 B2 * 8/2017 Waffenschmidt ....... H01F 38/14
(Continued)

FOREIGN PATENT DOCUMENTS

JP 2009-089520 A 4/2009
JP 2009-531009 A 8/2009
(Continued)

OTHER PUBLICATIONS

International Search Report issued for PCT/JP2014/056837, dated May 20, 2014.
(Continued)

*Primary Examiner* — Adi Amrany
(74) *Attorney, Agent, or Firm* — Arent Fox LLP

(57) ABSTRACT

A power transmission apparatus includes capacitors connected in series between an active electrode and a passive electrode. A power reception apparatus includes capacitors connected in series between an active electrode and a passive electrode. When a capacitance between the active electrodes is represented by Caa, a capacitance between the passive electrodes is represented by Cpp, and reactances of the capacitors are represented by X1, X2, X3, and X4; the active electrodes, the passive electrodes and the capacitors are configured such that Cpp/Caa=X1/X2=X3/X4 and Cpp≥Caa are satisfied. Thus, a wireless power transmission system capable of stabilizing an operation of a load circuit in the power reception apparatus is provided.

20 Claims, 9 Drawing Sheets

(51) Int. Cl.
*H02J 50/05* (2016.01)
*H02J 17/00* (2006.01)
*H02J 7/02* (2016.01)

(58) Field of Classification Search
USPC .......................................................... 307/109
See application file for complete search history.

(56) References Cited

U.S. PATENT DOCUMENTS

| | | |
|---|---|---|
| 9,748,801 B2 * | 8/2017 | Sempel ................... H02J 50/05 |
| 2009/0302690 A1 | 12/2009 | Kubono et al. |
| 2012/0262005 A1 | 10/2012 | Camurati et al. |
| 2014/0300201 A1 | 10/2014 | Ichikawa et al. |

FOREIGN PATENT DOCUMENTS

| | | |
|---|---|---|
| JP | 2009-296857 A | 12/2009 |
| JP | WO 2013/004569 A1 | 1/2013 |
| WO | WO 2012/157011 A1 | 11/2012 |
| WO | WO 2013/073508 A1 | 5/2013 |

OTHER PUBLICATIONS

Written Opinion of the International Searching Authority issued for PCT/JP2014/056867. dated May 20, 2014.

\* cited by examiner

WIRELESS POWER TRANSMISSION SYSTEM

CROSS REFERENCE TO RELATED APPLICATIONS

The present application is a continuation of PCT/JP2014/056837 filed Mar. 14, 2014, which claims priority to Japanese Patent Application No. 2013-056855, filed Mar. 19, 2013, and to Japanese Patent Application No. 2014-031873, filed Feb. 21, 2014, the entire contents of each of which are incorporated herein by reference.

FIELD OF THE INVENTION

The present invention relates to wireless power transmission systems that transmit power through capacitive coupling (electric-field coupling).

BACKGROUND OF THE INVENTION

Patent Document 1 discloses a wireless power transmission system that transmits power through capacitive coupling. The wireless power transmission system described in Patent Document 1 is constituted by a power transmission apparatus that includes a high-frequency high-voltage generator, a passive electrode, and an active electrode, and a power reception apparatus that includes a high-frequency high-voltage load, a passive electrode, and an active electrode. As the active electrode in the power transmission apparatus and the active electrode in the power reception apparatus approach each other with a gap interposed therebetween, the two electrodes capacitively couple with each other, and power is thus transmitted from the power transmission apparatus to the power reception apparatus. This wireless power transmission system of a capacitive coupling type is advantageous in that the amount of transmitted power per unit area can be increased and the degree of positional freedom along the mounting surface can be increased.

Patent Document 1: Japanese Unexamined Patent Application Publication (Translation of PCT Application) No. 2009-531009.

However, the wireless power transmission system described in Patent Document 1 has a problem in that, when a reference potential of the power reception apparatus varies relative to an earth potential, a load circuit of the power reception apparatus malfunctions during power transmission in a device, such as a touch panel, that a user touches. In addition, there is another problem in that, when a reference potential of the power transmission apparatus varies relative to the earth potential, unwanted noise is conducted to a power supply line. Thus, in a wireless power transmission system of a capacitive coupling system, it is important to suppress a variation of a reference potential during power transmission.

SUMMARY OF THE INVENTION

Accordingly, the present invention is directed to providing a wireless power transmission system capable of stabilizing an operation of a load circuit in a power reception apparatus.

According to the present invention, a power transmission system includes a power transmission apparatus that supplies an alternating current voltage across a first electrode and a second electrode from a feeder circuit; and a power reception apparatus that supplies, to a load circuit, an alternating current voltage produced between a third electrode, which faces the first electrode, and a fourth electrode, which faces the second electrode. The power transmission apparatus includes a first reactance element connected at a first end to the first electrode and at a second end to a reference potential of the power transmission apparatus, and a second reactance element connected at a first end to the second electrode and at a second end to the reference potential of the power transmission apparatus. The power reception apparatus includes a third reactance element connected at a first end to the third electrode and at a second end to a reference potential of the power reception apparatus, and a fourth reactance element connected at a first end to the fourth electrode and at a second end to the reference potential of the power reception apparatus. When Caa represents a capacitance produced between the first electrode and the third electrode, Cpp represents a capacitance produced between the second electrode and the fourth electrode, X1 represents a reactance of the first reactance element, X2 represents a reactance of the second reactance element, X3 represents a reactance of the third reactance element, and X4 represents a reactance of the fourth reactance element; the first electrode, the second electrode, the third electrode, the fourth electrode, the first reactance element, the second reactance element, the third reactance element, and the fourth reactance element are configured such that Cpp/Caa=X1/X2=X3/X4 and Cpp≥Caa are satisfied at a fundamental frequency of the alternating current voltage.

With this configuration, as the four reactance elements are provided so as to match the ratio of the capacitance Cpp produced between the second electrode and the fourth electrode to the capacitance Caa produced between the first electrode and the third electrode, a potential difference between a reference potential point in the power transmission apparatus and a reference potential point in the power reception apparatus can be brought to 0. Thus, a potential variation of the reference potential in the power reception apparatus can be reduced, and an operation of the load circuit in the power reception apparatus can be stabilized.

In addition, the third reactance element X3 and the fourth reactance element X4 do not include a resistance component, and thus the potential variation of the reference potential on the power reception side can be reduced over a broad frequency band. Although a reactance element is used, (resistance component is 0), an actual element includes a resistance component. However, the resistance component is sufficiently small with respect to a reactance component.

The feeder circuit may be disposed between the first electrode and the second electrode in the power transmission apparatus, the power transmission apparatus may include a shield electrode connected to the reference potential, and the second end of the first reactance element and the second end of the second reactance element may be connected to the shield electrode.

Here, the shield electrode is provided in order to suppress radiation of noise generated from the feeder circuit in the power transmission apparatus. In this configuration, a node between the first reactance element and the second reactance element is connected to the reference potential with the shield electrode interposed therebetween. Then, as the shield electrode, which has an area sufficient to block the noise, is added to a conductor constituting the reference potential on the power transmission side, the reference potential in the power transmission apparatus can be stabilized. Through this configuration, a problem that unwanted noise is conducted (leaks) to a power supply line as the reference potential of the power transmission apparatus varies relative to the earth potential can be prevented. In addition, the potential difference between the reference potential point in the power transmission apparatus and the reference potential point in the power reception apparatus can be brought to 0. Thus, the potential variation of the reference potential in the power reception apparatus is reduced, and the operation of the load circuit in the power reception apparatus can be stabilized.

The load circuit may be disposed between the third electrode and the fourth electrode in the power reception apparatus, the power reception apparatus may include a shield electrode connected to the reference potential, and the second end of the third reactance element and the second end of the fourth reactance element may be connected to the shield electrode.

Here, the shield electrode is provided in order to suppress radiation of noise generated from a high-voltage portion (load circuit) in the power reception apparatus. In this configuration, a node between the third reactance element and the fourth reactance element is connected to the reference potential with the shield electrode interposed therebetween. Then, as the shield electrode, which has an area sufficient to block the noise, is added to a conductor constituting the reference potential on the power reception side, the reference potential in the power reception apparatus can be stabilized, and thus the operation of the load circuit in the power reception apparatus can be stabilized. In addition, the potential difference between the reference potential point in the power transmission apparatus and the reference potential point in the power reception apparatus can be brought to 0, and the potential variation of the reference potential in the power transmission apparatus is reduced. Thus, a problem that unwanted noise is conducted (leaks) to the power supply line due to a variation of the reference potential of the power transmission apparatus relative to the earth potential can be prevented.

At least one of the first reactance element, the second reactance element, the third reactance element, and the fourth reactance element may include a variable reactance element.

With this configuration, even after an element is mounted, the condition of Cpp/Caa=X1/X2=X3/X4 by which the potential difference between the reference potential point in the power transmission apparatus and the reference potential point in the power reception apparatus is brought to 0 can be satisfied.

According to the present invention, a potential variation of the reference potential in the power reception apparatus can be reduced, and the operation of the load circuit in the power reception apparatus can be stabilized.

DETAILED DESCRIPTION OF THE EXEMPLARY EMBODIMENTS

First Embodiment

Figure 1:
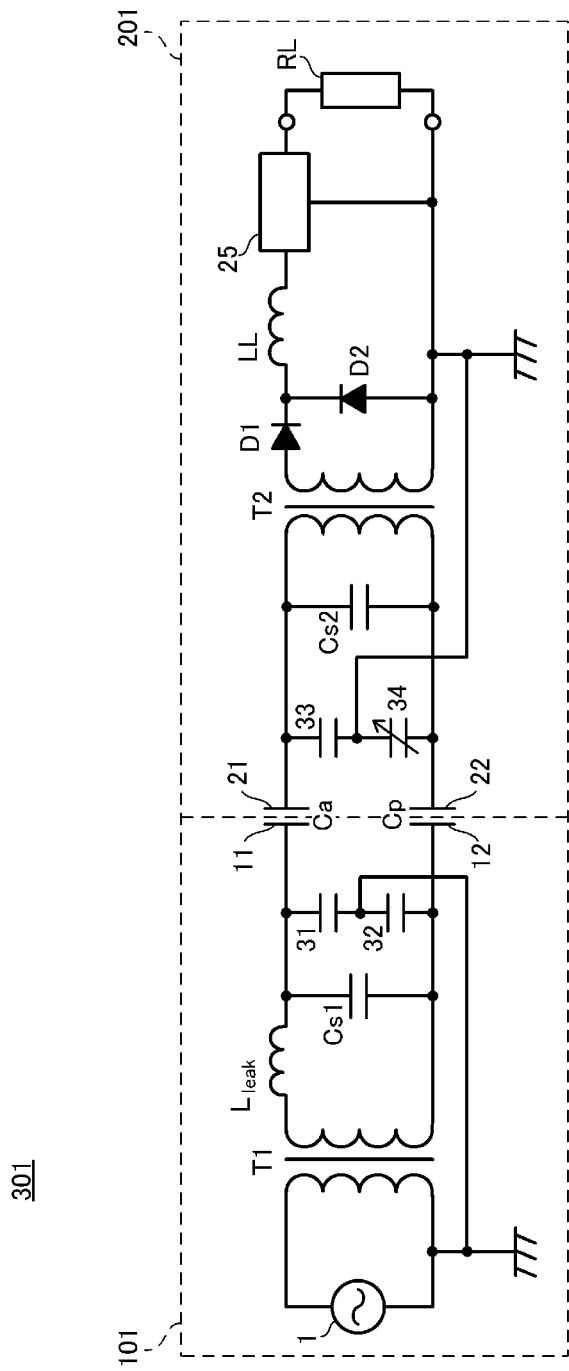
FIG. 1 is a circuit diagram of a wireless power transmission system according to a first embodiment.

FIG. 1 is a circuit diagram of a wireless power transmission system 301 according to a first embodiment. The wireless power transmission system 301 includes a power transmission apparatus 101 and a power reception apparatus 201. The power reception apparatus 201 includes a load circuit RL. The load circuit RL includes a secondary battery, a charging circuit for the secondary battery, a touch panel, which serves as an input unit, and so on, and none of them are illustrated. The power reception apparatus 201 is, for example, a portable electronic apparatus. Examples of the portable electronic apparatus include a cellular phone, a PDA, a portable music player, a laptop computer, and a digital camera. The power reception apparatus 201 is placed on the power transmission apparatus 101, and the power transmission apparatus 101 charges the secondary battery of the power reception apparatus 201.

The touch panel operates on the secondary battery serving as a power source.

Referring to FIG. 1, a high-frequency voltage generating circuit 1 of the power transmission apparatus 101 generates a high-frequency voltage of, for example, 100 kHz to several tens of MHz. The voltage generated by the high-frequency voltage generating circuit 1 is boosted by a step-up transformer T1, and the boosted voltage is applied across an active electrode 11 and a passive electrode 12. A leakage inductance $L_{leak}$ of the step-up transformer T1 forms a resonance circuit with a capacitor Cs1 produced between the active electrode 11 and the passive electrode 12. The capacitor Cs1 may be an actual element or may be a parasitic capacitance.

It is to be noted that the active electrode 11 corresponds to a first electrode according to the present invention, and the passive electrode 12 corresponds to a second electrode according to the present invention.

Capacitors 31 and 32 are connected in series between the active electrode 11 and the passive electrode 12. Specifically, the capacitor 31 is connected to the active electrode 11, and the capacitor 32 is connected to the passive electrode 12. A node between the capacitor 31 and the capacitor 32 is connected to a reference potential of the power transmission apparatus 101. The capacitors 31 and 32 may be actual elements, may be parasitic capacitances formed between the active electrode 11 or the passive electrode 12 and the reference potential of the power transmission apparatus, or may be a combination of an actual element and a parasitic capacitance. In addition, the capacitors 31 and 32 may include a line capacitance of the step-up transformer T1.

The capacitor 31 corresponds to a first reactance element according to the present invention, and the capacitor 32 corresponds to a second reactance element according to the present invention.

When the power reception apparatus 201 is placed on the power transmission apparatus 101, an active electrode 21 of the power reception apparatus 201 faces the active electrode 11 of the power transmission apparatus 101, and a passive electrode 22 faces the passive electrode 12. When a voltage is applied across the active electrode 11 and the passive electrode 12 in the power transmission apparatus 101, the active electrodes 11 and 21 capacitively couple with each other, and the passive electrodes 12 and 22 also capacitively couple with each other. A voltage is thus induced between the active electrode 21 and the passive electrode 22 through the aforementioned capacitive coupling, and power is transmitted from the power transmission apparatus 101 to the power reception apparatus 201.

The active electrode 21 corresponds to a third electrode according to the present invention, and the passive electrode 22 corresponds to a fourth electrode according to the present invention.

Capacitors 33 and 34 are connected in series between the active electrode 21 and the passive electrode 22. Specifically, the capacitor 33 is connected to the active electrode 21, and the capacitor 34 is connected to the passive electrode 22. A node between the capacitors 33 and 34 is connected to a reference potential of the power reception apparatus 201. The capacitors 33 and 34 may be actual elements, may be parasitic capacitances formed between the active electrode 21 or the passive electrode 22 and the reference potential of the power reception apparatus, or may be a combination of an actual element and a parasitic capacitance. In addition, the capacitors 33 and 34 may include a line capacitance of a step-down transformer T2.

The capacitor 33 corresponds to a third reactance element according to the present invention, and the capacitor 34 corresponds to a fourth reactance element according to the present invention.

A voltage induced between the active electrode 21 and the passive electrode 22 is stepped down by the step-down transformer T2, rectified and smoothed by an inductor LL, diodes D1 and D2, and a DC-DC converter 25, and applied to the load circuit RL. It is to be noted that a primary coil of the step-down transformer T2 forms a resonance circuit with a capacitor Cs2 produced between the active electrode 21 and the passive electrode 22 illustrated in FIG. 1. The capacitor Cs2 may be an actual element or may be a parasitic capacitance.

A capacitor Ca illustrated in FIG. 1 is a capacitance produced (equivalently connected) between the active electrodes 11 and 21, and a capacitor Cp is a capacitance produced (equivalently connected) between the passive electrodes 12 and 22. When a capacitance of the capacitor Ca is represented by Caa and a capacitance of the capacitor Cp is represented by Cpp, the active electrodes 11 and 21 and the passive electrodes 12 and 22 are configured so that a relation of Caa≤Cpp holds true. As this relation holds true, a high voltage can be produced only in the active electrodes 11 and 21, and a relatively low voltage can be produced in the passive electrodes 12 and 22.

The capacitors 31, 32, 33, and 34 are provided in order to stabilize the reference potential of the power reception apparatus 201. Capacitance values of the respective capacitors 31, 32, 33, and 34 are set in relation to a capacitance ratio between Ca and Cp. A method for setting the capacitance values will be described later in detail.

It is to be noted that, in the power transmission apparatus 101, a resonant frequency of a combined capacitance of the capacitors Cs1, 31, and 32 and the leakage inductance $L_{leak}$ of the step-up transformer T1 is set near the frequency of a high-frequency voltage generated by the high-frequency voltage generating circuit 1. In addition, in the power reception apparatus 201, a resonant frequency of a combined capacitance of the capacitors Cs2, 33, and 34 and a primary-side excitation inductance of the step-down transformer 21 is set near the frequency of a high-frequency voltage generated by the high-frequency voltage generating circuit 1. Thus, when the power reception apparatus 201 is placed on the power transmission apparatus 101, the active electrodes 11 and 21 capacitively couple with each other, the passive electrodes 12 and 22 capacitively couple with each other, and power is thus transmitted from the power transmission apparatus 101 to the power reception apparatus 201, a composite resonance is formed as the resonance circuits couple with each other, and power can be transmitted with little loss near the frequency of the high-frequency voltage generated by the high-frequency voltage generating circuit 1.

Figure 2:
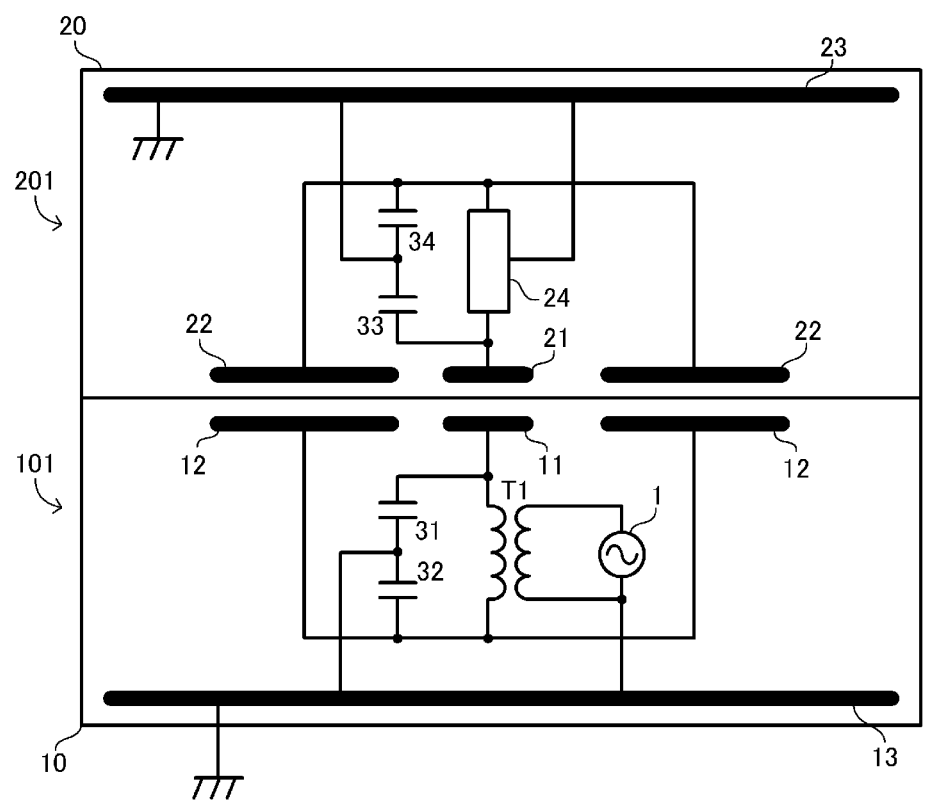
FIG. 2 is a sectional view conceptually illustrating primary portions of a power transmission apparatus and a power reception apparatus that constitute a power transmission system.
Figure 3:
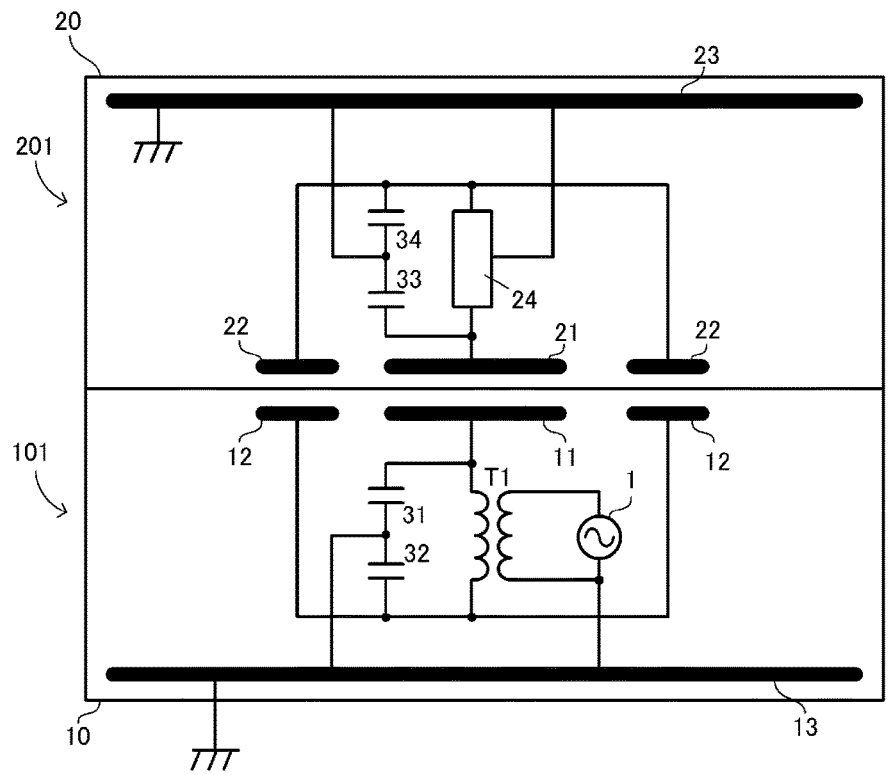
FIG. 3 is a sectional view conceptually illustrating primary portions of a power transmission apparatus and a power reception apparatus that constitute a power transmission system.

FIG. 2 and FIG. 3 are sectional views each conceptually illustrating primary portions of the power transmission apparatus 101 and the power reception apparatus 201 that constitute the power transmission system 301. FIG. 2 is a sectional view in which a relation of Caa<Cpp holds true, and FIG. 3 is a sectional view in which a relation of Caa=Cpp holds true.

The active electrode 11 and the passive electrode 12 are provided near an upper face (face on which the power reception apparatus 201 is placed) of a housing 10 of the power transmission apparatus 101. The housing 10 is a plastic compact made, for example, of an ABS resin or the like. The active electrode 11 and the passive electrode 12 are integrally formed inside the housing 10, and thus an outer surface of the housing 10 is made into an insulating structure.

The active electrode 11 and the passive electrode 12 are provided along the same plane, and the passive electrode 12 is provided so as to enclose the active electrode 11 with a space provided therebetween. As the passive electrode 12 encloses the active electrode 11, an effect that the passive electrode shields the active electrode is produced, and thus radiation of noise produced due to the capacitive coupling of the active electrodes 11 and 21 in which a higher voltage is being generated can be suppressed.

In addition, a shield electrode 13 is provided near a bottom face of the housing 10 of the power transmission apparatus 101 at a position where the shield electrode 13 faces the active electrode 11 and the passive electrode 12. The shield electrode 13 is provided so as to provide a shield between the ground (earth) and the active electrode 11 and the passive electrode 12, which serve as a high voltage unit.

The shield electrode 13 is connected to the reference potential of the power transmission apparatus 101. In the present embodiment, the reference potential of the shield electrode 13 is an earth potential. It is to be noted that the shield electrode 13 may be provided on a side face of the housing 10 along the housing 10. In addition, the shield electrode 13 does not need to be connected to the earth.

The capacitors 31 and 32 are connected in series between the active electrode 11 and the passive electrode 12. The node between the capacitors 31 and 32 is connected to the shield electrode 13 and is further connected to the reference potential with the shield electrode 13 interposed therebetween.

A high-frequency high-voltage generating circuit that includes the high-frequency voltage generating circuit 1 and the step-up transformer T1 is provided in the housing 10. This high-frequency high-voltage generating circuit applies a high-frequency high voltage across the active electrode 11 and the passive electrode 12. The primary side of the step-up transformer T1 is connected to the reference potential with the shield electrode 13 interposed therebetween.

The active electrode 21 and the passive electrode 22 are provided near a bottom face (face that is placed on the upper face of the power transmission apparatus 101) of a housing 20 of the power reception apparatus 201. The housing 20 is a plastic compact made, for example, of an ABS resin or the like. The active electrode 21 and the passive electrode 22 are integrally formed inside the housing 20, and thus an outer surface of the housing 20 is made into an insulating structure.

The active electrode 21 and the passive electrode 22 are provided along the same plane, and the passive electrode 22 is provided so as to enclose the active electrode 21 with a space provided therebetween, as in the power transmission apparatus 101. In addition, a shield electrode 23 is provided near an upper face of the housing 20 at a position where the shield electrode 23 faces the active electrode 21 and the passive electrode 22. The shield electrode 23 is connected to the reference potential of the power reception apparatus 201.

When Caa<Cpp holds true (FIG. 2), the configuration is such that the areas of the passive electrodes 12 and 22 are greater than the areas of the active electrodes 11 and 21. In this case, a voltage produced between the active electrodes 11 and 21 is greater than a voltage produced between the passive electrodes 12 and 22. Meanwhile, when Caa=Cpp holds true (FIG. 3), the configuration is such that the areas of the active electrodes 11 and 21 are equal to the areas of the passive electrodes 12 and 22. In this case, a voltage produced between the active electrodes 11 and 21 is equal to a voltage produced between the passive electrodes 12 and 22.

The capacitors 33 and 34 are connected in series between the active electrode 21 and the passive electrode 22. The node between the capacitors 33 and 34 is connected to the shield electrode 23 and is further connected to the reference potential of the power reception apparatus 201 with the shield electrode 23 interposed therebetween. It is to be noted that the shield electrode 23 may be provided on a side face of the housing 20 along the housing 20.

A power reception side circuit 24 that receives a voltage induced between the active electrode 21 and the passive electrode 22 is provided inside the housing 20. The power reception side circuit 24 includes the step-down transformer T2, the inductor LL, the diodes D1 and D2, the DC-DC converter 25, the load circuit RL, and so on, illustrated in FIG. 1. The power reception side circuit 24 (specifically, the secondary side of the step-down transformer T2) is connected to the reference potential of the power reception apparatus 201 with the shield electrode 23 interposed therebetween.

Now, the method for configuring the capacitors 31, 32, 33, and 34 will be described in detail. Hereinafter, a configuration method in a case in which the load circuit RL side is set to a no-load state and a configuration method in a case in which the load circuit RL side is not set to a no-load state will be described.

Figure 4:
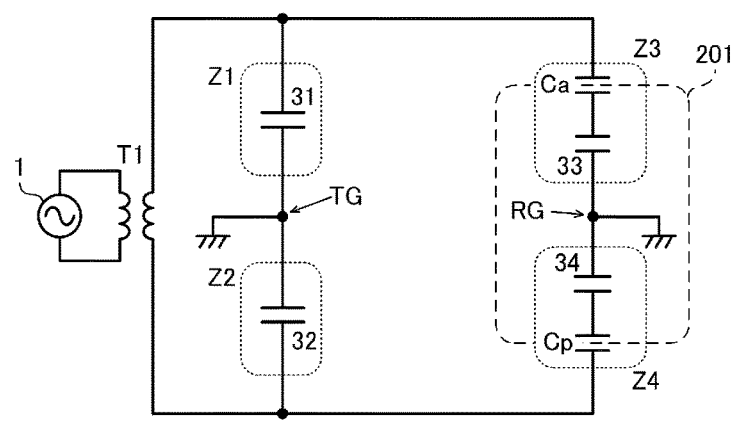
FIG. 4 is an equivalent circuit diagram of a wireless power transmission system, with a part thereof omitted, while a load circuit RL side is in a no-load state.

FIG. 4 is an equivalent circuit diagram of the wireless power transmission system 301, with a part thereof omitted, in a case in which the load circuit RL side is in a no-load state. In FIG. 4, primarily a circuit constituted by the capacitors 31, 32, 33, and 34 and the capacitors Ca and Cp is illustrated, and other circuits, such as the power reception side circuit 24 of the power reception apparatus 201, are omitted. In addition, TG indicated in FIG. 4 corresponds to a reference potential point of the power transmission apparatus 101, and RG corresponds to a reference potential point of the power reception apparatus 201.

In FIG. 4, impedances of the capacitors 31 and 32 are represented by Z1 and Z2. In addition, an impedance of a series circuit of the capacitor 33 and the capacitor Ca is represented by Z3, and an impedance of a series circuit of the capacitor 34 and the capacitor Cp is represented by Z4. The impedances Z1 and Z2 are expressed as follows.

$$Z1 = R1 + jX1 \quad (1)$$

$$Z2 = R2 + jX2 \quad (2)$$

In addition, when the impedances of the capacitors 33 and 34 are expressed, respectively, as R3+jX3 and R4+jX4, the impedances Z3 and Z4 are expressed as follows.

$$Z3 = 1/j\omega Caa + R3 + jX3 \quad (3)$$

$$Z4 = 1/j\omega Cpp + R4 + jX4 \quad (4)$$

The capacitances of the capacitors 31, 32, 33, and 34 are set so as to match the ratio of the capacitance Cpp produced between the passive electrodes 12 and 22 to the capacitance Caa produced between the active electrodes 11 and 12. In other words, the capacitors 31, 32, 33, and 34 are configured so that the condition of the following expression (5) is satisfied at a fundamental frequency of an alternating current voltage from the high-frequency voltage generating circuit 1.

$$Cpp/Caa = X1/X2 = X3/X4 \quad (5)$$

It is to be noted that, as stated above, Caa≤Cpp holds true.

Figure 5:
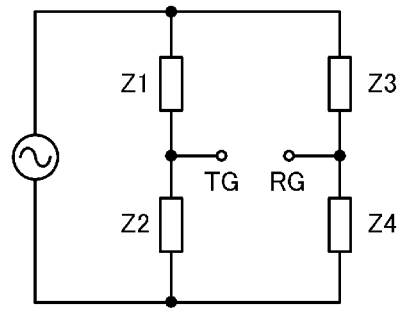
FIG. 5 is a simplified equivalent circuit diagram of a wireless power transmission system, in which a bridge circuit is extracted.

As the condition of the expression (5) is satisfied, the potential difference between the reference potential point TG in the power transmission apparatus and the reference potential point RG in the power reception apparatus becomes 0. This is because the circuit constituted by the capacitors 31, 32, 33, and 34 and the capacitors Ca and Cp forms a bridge circuit. This bridge circuit is illustrated in FIG. 5. FIG. 5 is a simplified equivalent circuit diagram of the wireless power transmission system 301, in which the bridge circuit is extracted. In FIG. 5, a circuit of impedance elements is indicated by reference characters identical to those of the impedances Z1, Z2, Z3, and Z4.

As illustrated in FIG. 5, a node between the impedance element Z1 and the impedance element Z2 corresponds to the reference potential point TG in the power transmission apparatus, and a node between the impedance element Z3 and the impedance element Z4 corresponds to the reference potential point RG in the power reception apparatus. An equilibrium condition in this bridge circuit is as follows.

$$Z1/Z2 = Z3/Z4 \quad (6)$$

When this equilibrium condition is satisfied, the potential difference between the reference potential point TG in the power transmission apparatus and the reference potential point RG in the power reception apparatus becomes 0.

When the real part and the imaginary part of an expression obtained through the above expressions (1) through (4) and (6) are set to 0, the following expressions (7) and (8) are obtained.

[Math. 1]

$$R1R4 - R2R3 + \left(X3 - \frac{1}{\omega Caa}\right)X2 - \left(X4 - \frac{1}{\omega Cpp}\right)X1 = 0 \quad (7)$$

$$R4X1 - R3X2 + \left(X4 - \frac{1}{\omega Cpp}\right)R1 - \left(X3 - \frac{1}{\omega Caa}\right)R2 = 0 \quad (8)$$

When a resistance component is ignored, the following expression (9) is obtained from the expression (7).

[Math. 2]

$$\left(X3 - \frac{1}{\omega Caa}\right)X2 - \left(X4 - \frac{1}{\omega Cpp}\right)X1 = 0 \quad (9)$$

When k=Cpp/Caa, k1=X1/X2, and k2=X3/X4, the expression (9) turns into the following expression (10).

[Math. 3]

$$\left(\frac{1}{k2} - \frac{1}{k1}\right)X3 + \frac{1}{\omega Caa}\left(\frac{1}{k1} - \frac{1}{k}\right) = 0 \quad (10)$$

As a result, k=k1=k2 is obtained, and the above expression (5) holds true. In this manner, as the capacitors 31, 32, 33, and 34, the active electrodes 11 and 21, and the passive electrodes 12 and 22 are designed so that the condition of the expression (5) is satisfied, the potential difference between the reference potential point TG in the power transmission apparatus and the reference potential point RG in the power reception apparatus becomes 0.

Figure 6:
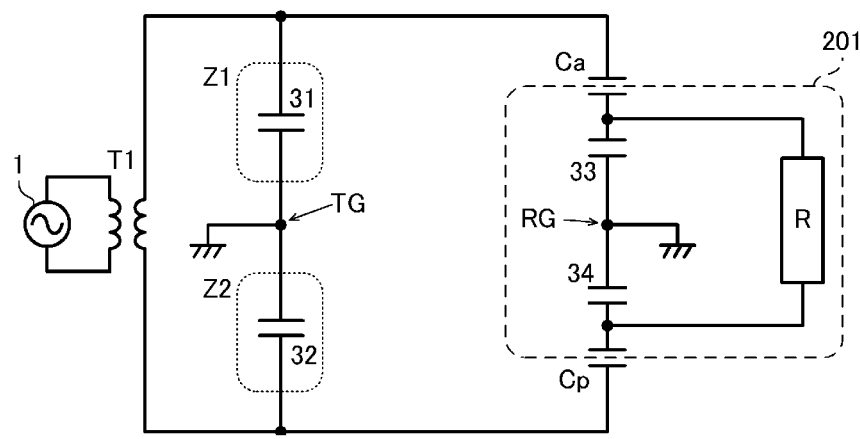
FIG. 6 is an equivalent circuit diagram of a wireless power transmission system, with a part thereof omitted, while the load circuit RL side is not in a no-load state.
Figure 7:
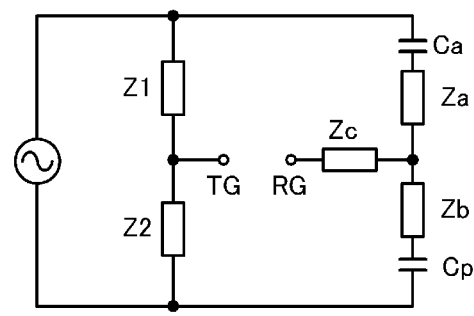
FIG. 7 is a circuit diagram in a case in which capacitors and a resistance illustrated in FIG. 6 are subjected to Δ-Y conversion.

FIG. 6 is an equivalent circuit diagram of the wireless power transmission system 301, with a part thereof omitted, in a case in which the load circuit RL side is not in a no-load state. The circuit illustrated in FIG. 6 has a configuration in which a resistance R is added to the circuit illustrated in FIG. 4. FIG. 7 illustrates a circuit in a case in which the capacitors 33 and 34 and the resistance R illustrated in FIG. 6 are subjected to Δ-Y conversion.

Impedances of Za and Zb indicated in FIG. 7 are expressed through the following expressions (11) and (12).

[Math. 4]

$$Za = \frac{jX3 \cdot R}{j(X3 + X4) + R} \quad (11)$$

$$Zb = \frac{jX4 \cdot R}{j(X3 + X4) + R} \quad (12)$$

Then, on the basis of the equilibrium condition of the bridge circuit, when the following expression (13) is satisfied, the potential difference between the reference potential point TG in the power transmission apparatus and the reference potential point RG in the power reception apparatus becomes 0.

[Math. 5]

$$Z1\left(Zb + \frac{1}{j\omega Cpp}\right) = Z2\left(Za + \frac{1}{j\omega Caa}\right) \quad (13)$$

With resistance components R1, R2, R3, and R4 being ignored, when k=Cpp/Caa, k1=X1/X2, and k2=X3/X4, the expression (13) turns into the following expression (14).

[Math. 6]

$$\left(\omega Caa(k1 - k2) + \left(1 - \frac{k1}{k}\right)\right) \cdot R + j(1 + k2)\left(1 - \frac{k1}{k}\right) = 0 \quad (14)$$

In the expression (14), when k=k1=k2, the expression (14) holds true regardless of the resistance R and ωCaa. In other words, the above expression (13) holds true, and the potential difference between the reference potential point TG in the power transmission apparatus and the reference potential point RG in the power reception apparatus becomes 0.

Regardless of whether the load circuit RL side is set to a no-load state or is not set to a no-load state, as long as the potential difference between the reference potential point TG in the power transmission apparatus and the reference potential point RG in the power reception apparatus becomes 0, the potential at the reference potential point RG in the power reception apparatus becomes equal to the ground potential of the power transmission apparatus 101. Typically, the ground potential of the power transmission apparatus 101 is at a ground potential (earth potential), and thus when the equilibrium condition of the above expression (5) or the expression (13) is satisfied, the reference potential in the power reception apparatus 201 can be brought close to the ground potential (earth potential) as well. Thus, when the power reception apparatus 201 includes a device (electrostatic capacity type touch panel) with which a person makes contact to electrostatically input data, a malfunction that an input is not accepted or an intended input is carried out can be prevented even when a user operates the touch panel while power is transmitted from the power transmission apparatus 101 to the power reception apparatus 201.

It is to be noted that any one or all of the capacitors 31, 32, 33, and 34 may be variable capacitors. In this case, even after the capacitor 34 is mounted, the expression (5) or the expression (13) can be satisfied. Then, the potential difference between the reference potential point TG in the power transmission apparatus and the reference potential point RG in the power reception apparatus can be brought to 0, and the reference potential in the power reception apparatus 201 can be stabilized.

Although the reference potential of the power transmission apparatus 101 is at the earth potential in the present embodiment, the reference potential of the power transmission apparatus 101 does not need to be at the earth potential. Even in this case, when the housing of the power transmission apparatus 101 is larger than the power reception apparatus 201, for example, the reference potential of the power transmission apparatus 101 is more stable than the reference potential of the power reception apparatus 201. Thus, as the reference potential of the power reception apparatus 201 is controlled so as to be substantially equal to the reference potential of the power transmission apparatus 101, a malfunction can be prevented even when a user operates the touch panel while power is transmitted from the power transmission apparatus 101 to the power reception apparatus 201.

Figure 8:
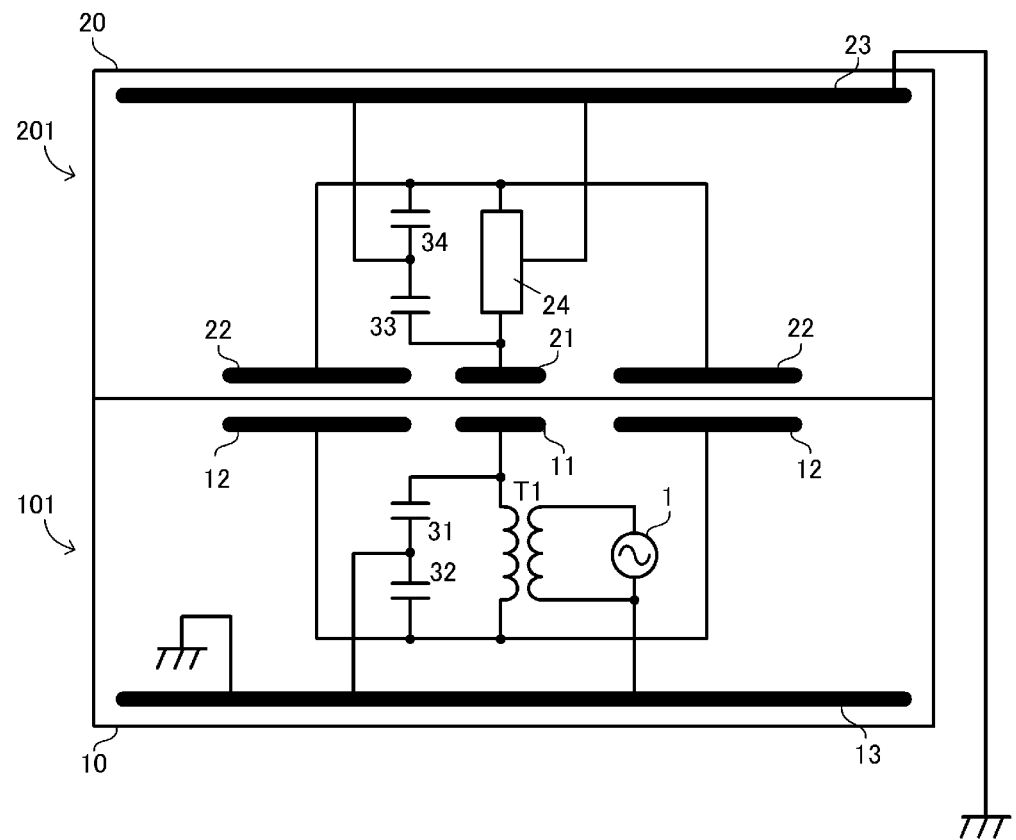
FIG. 8 is a sectional view conceptually illustrating primary portions of a power transmission apparatus and a power reception apparatus according to another example.

FIG. 8 is a sectional view conceptually illustrating primary portions of a power transmission apparatus and a power reception apparatus according to another example. As illustrated in FIG. 8, the reference potential of a power reception apparatus 201 may be set to the earth potential. Even in this case, as the equilibrium condition of the above expression (5) or the expression (13) is satisfied, the reference potential of a power transmission apparatus 101 can be brought to the earth potential, which is the reference potential of the power reception apparatus 201.

Second Embodiment

A wireless power transmission system according to a second embodiment differs from the wireless power transmission system according to the first embodiment in terms of a power reception apparatus. Hereinafter, the differences will be described.

Figure 9:
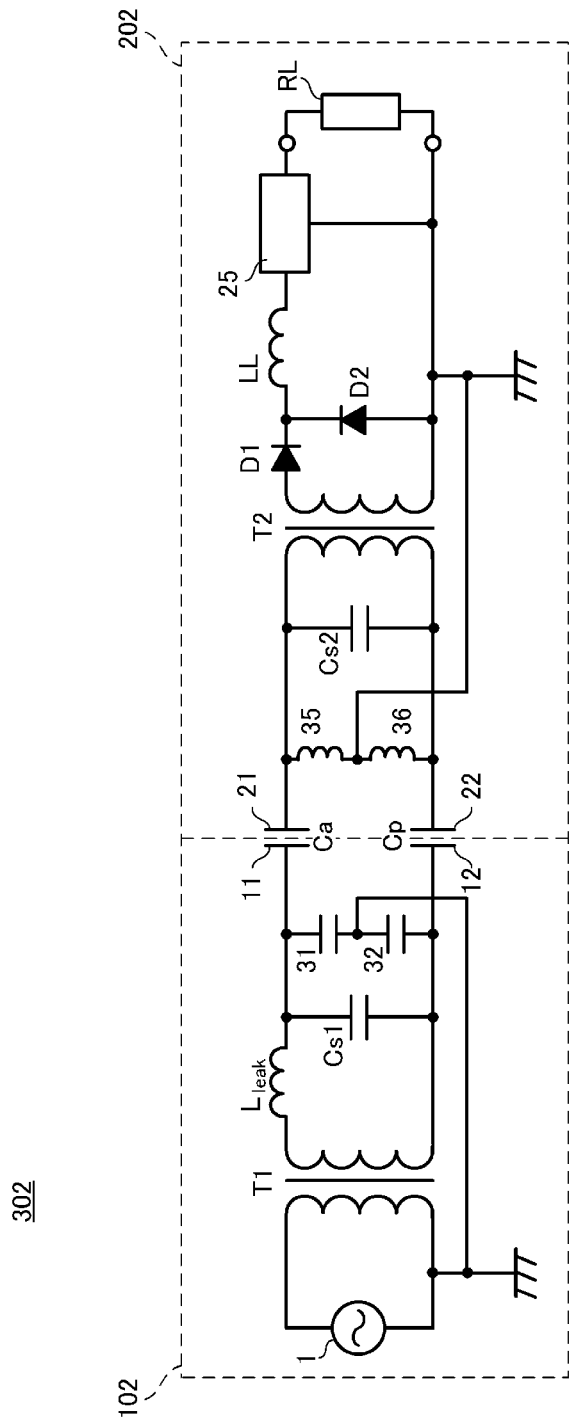
FIG. 9 is an equivalent circuit diagram of a wireless power transmission system according to a second embodiment.

FIG. 9 is an equivalent circuit diagram of a wireless power transmission system 302 according to the second embodiment. The wireless power transmission system 302 includes a power transmission apparatus 102 and a power reception apparatus 202. The power transmission apparatus 102 is identical to the power transmission apparatus 101 according to the first embodiment, and thus description thereof will be omitted.

In the power reception apparatus 202, inductors 35 and 36 connected in series between the active electrode 21 and the passive electrode 22 are provided. Specifically, the inductor 35 is connected to the active electrode 21, and the inductor 36 is connected to the passive electrode 22. A node between the inductors 35 and 36 is connected to a reference potential of the power reception apparatus 202. The inductor 35 corresponds to the third reactance element according to the present invention, and the inductor 36 corresponds to the fourth reactance element according to the present invention. It is to be noted that the capacitors 31 and 32 may be replaced by inductors. In addition, the aforementioned inductors 35 and 36 may be variable inductance elements.

It is to be noted that the remaining portion of the power reception apparatus 202 is identical to that of the power reception apparatus 102 according to the first embodiment, and thus description thereof will be omitted.

A circuit constituted by the capacitors 31 and 32, the inductors 35 and 36, and the capacitors Ca and Cp forms a bridge circuit, as in the first embodiment illustrated in FIG. 5 or FIG. 7. When inductances of the inductors 35 and 36 are represented by L1 and L2, their respective reactances X5 and X6 are expressed as $X5=\omega L1$ and $X6=\omega L2$. The reactances X5 and X6 correspond to Z3 and Z4 indicated in FIG. 5 (note, however, that the signs are reversed). Then, on the basis of the expression (5) or the expression (13), the following holds true.

$$Cpp/Caa=X1/X2=L1/L2 \quad (15)$$

As the capacitors 31 and 32, the inductors 35 and 36, the active electrodes 11 and 21, and the passive electrodes 12 and 22 are designed so that the condition of the expression (15) is satisfied, the potential difference between the reference potential point TG in the power transmission apparatus and the reference potential point RG in the power reception apparatus becomes 0. When the reference potential point TG in the power transmission apparatus is connected to the ground potential of the power transmission apparatus, the potential at the reference potential point RG in the power reception apparatus becomes equal to the ground potential of the power transmission apparatus. Typically, the ground potential of the power transmission apparatus 102 is at a ground potential (earth potential), and thus when the equilibrium condition of the above expression (15) is satisfied, the reference potential in the power reception apparatus 202 can be brought close to the ground potential (earth potential) as well. Thus, when the power reception apparatus 202 includes a device (electrostatic capacity type touch panel) with which a person makes contact to electrostatically input data, a malfunction of the load circuit RL in the power reception apparatus 202 can be prevented even when a user operates the touch panel while power is transmitted from the power transmission apparatus 102 to the power reception apparatus 202.

Third Embodiment

In a wireless power transmission system according to the present embodiment, capacitances corresponding to the capacitors 31, 32, 33, and 34 described in the first embodiment are formed by parasitic capacitances produced in a power transmission apparatus and a power reception apparatus, and the reference potential of the power reception apparatus is stabilized. Hereinafter, the differences will be described.

Figure 10:
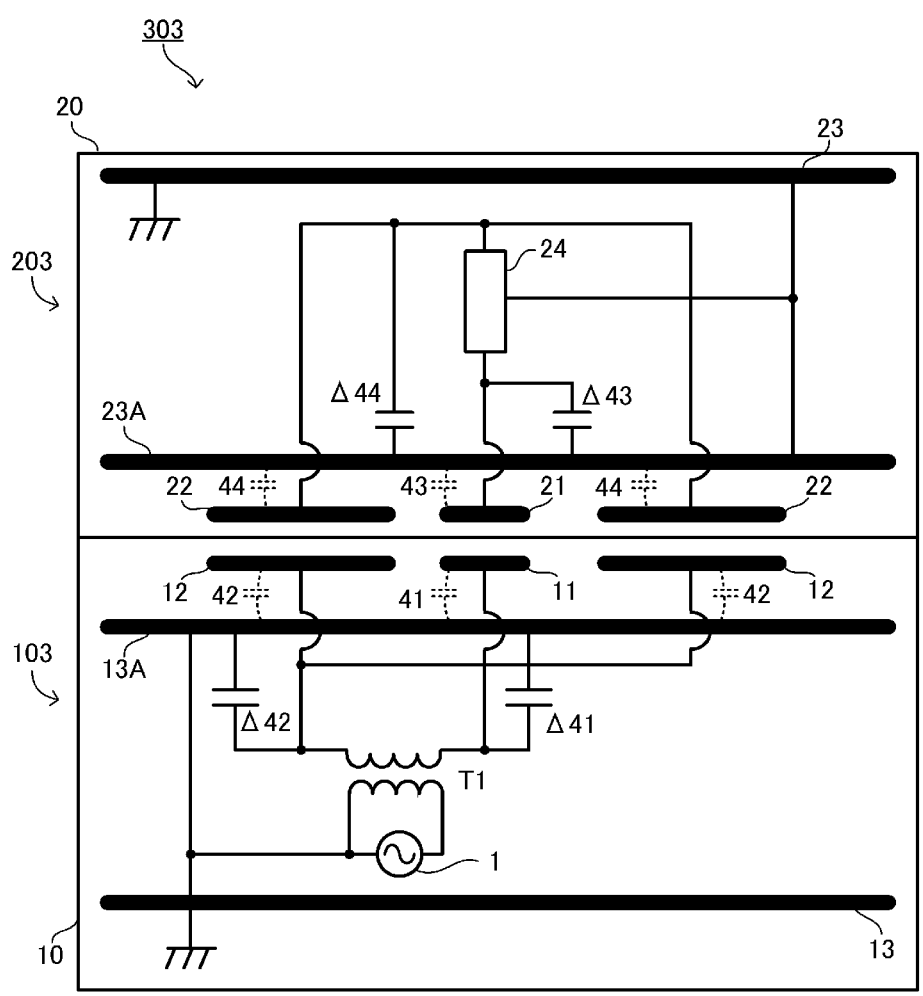
FIG. 10 is a sectional view conceptually illustrating primary portions of a power transmission apparatus and a power reception apparatus that constitute a wireless power transmission system according to a third embodiment.
Figure 11:
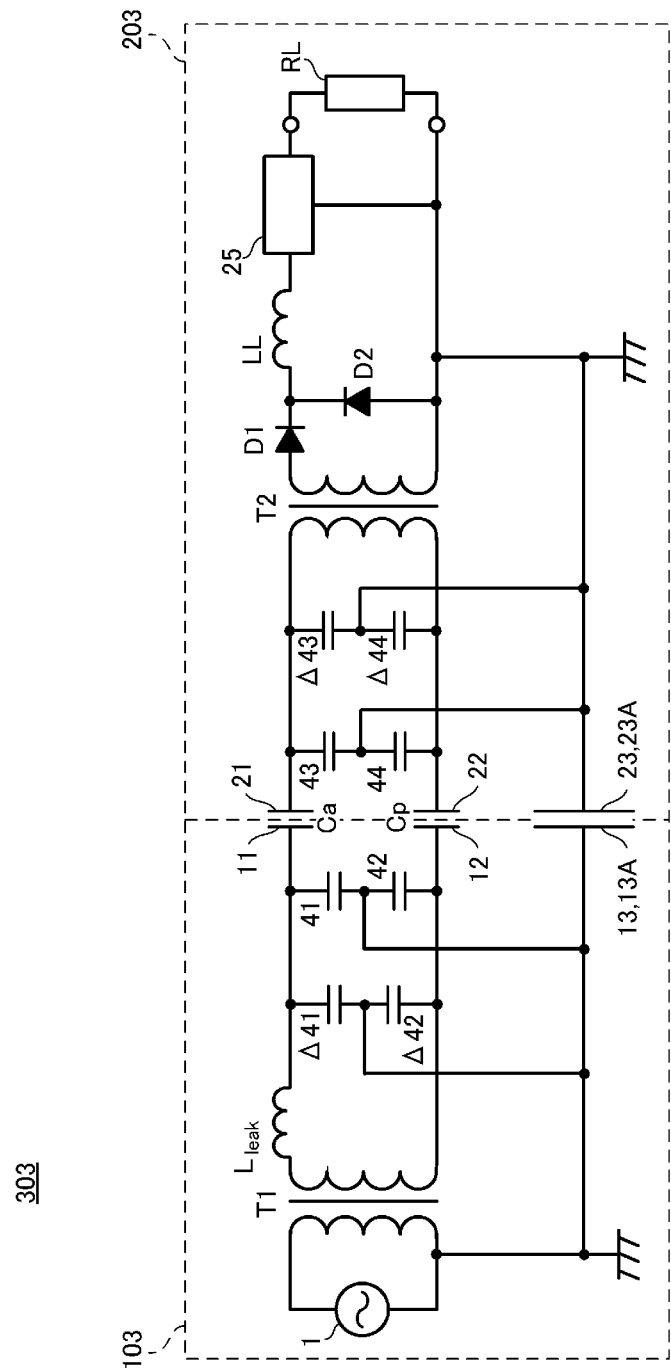
FIG. 11 is a circuit diagram of the wireless power transmission system illustrated in FIG. 10.

FIG. 10 is a sectional view conceptually illustrating primary portions of a power transmission apparatus 103 and a power reception apparatus 203 that constitute a wireless power transmission system 303 according to a third embodiment. FIG. 11 is a circuit diagram of the wireless power transmission system 303 illustrated in FIG. 10. It is to be noted that the capacitors Cs1 and Cs2 are omitted in FIG. 11.

In the wireless power transmission system 303, the power transmission apparatus 103 and the power reception apparatus 203 include shield electrodes 13A and 23A, respectively, that are connected to the reference potentials of the respective apparatuses. The shield electrode 13A is disposed in the vicinity of the active electrode 11 and the passive electrode 12 and is at a potential equal to the potential of the shield electrode 13. The shield electrode 23A is disposed in the vicinity of the active electrode 21 and the passive electrode 22 and is at a potential equal to the potential of the shield electrode 23.

When the power reception apparatus 203 is placed on the power transmission apparatus 103, the active electrodes 11 and 21 and the passive electrodes 12 and 22 are interposed between the shield electrodes 13A and 23A. As a high potential portion (the active electrodes 11 and 21) is sandwiched by the shield electrodes 13A and 23A, leakages (radiation of noise) of an electric field produced between the active electrodes 11 and 21 and an electric field produced between the passive electrodes 12 and 22 can be suppressed.

In the power transmission apparatus 103, as the shield electrode 13A is provided in the vicinity of the active electrode 11 and the passive electrode 12, parasitic capacitances are produced between the shield electrode 13A and the active electrode 11 and between the shield electrode 13A and the passive electrode 12. Here, the parasitic capacitance produced between the shield electrode 13A and the active electrode 11 is represented as a capacitor 41, and the parasitic capacitance produced between the shield electrode 13A and the passive electrode 12 is represented as a capacitor 42.

In addition, in the power reception apparatus 203, as the shield electrode 23A is provided in the vicinity of the active electrode 21 and the passive electrode 22, parasitic capacitances are produced between the shield electrode 23A and the active electrode 21 and between the shield electrode 23A and the passive electrode 22. Here, the parasitic capacitance produced between the shield electrode 23A and the active electrode 21 is represented as a capacitor 43, and the parasitic capacitance produced between the shield electrode 23A and the passive electrode 22 is represented as a capacitor 44.

The capacitor 41 corresponds to the first reactance element according to the present invention, and the capacitor 42 corresponds to the second reactance element according to the present invention. In addition, the capacitor 43 corresponds to the third reactance element according to the present invention, and the capacitor 44 corresponds to the fourth reactance element according to the present invention. The power transmission apparatus 103 includes a capacitor Δ41 connected between the active electrode 11 and the shield electrode 13A, and a capacitor Δ42 connected between the passive electrode 12 and the shield electrode 13A. With this connection configuration, as illustrated in FIG. 11, the capacitor Δ41 is connected in parallel to the capacitor 41, and the capacitor Δ42 is connected in parallel to the capacitor 42.

The power reception apparatus 203 includes a capacitor Δ43 connected between the active electrode 21 and the shield electrode 23A, and a capacitor Δ44 connected between the passive electrode 22 and the shield electrode 23A. With this connection configuration, as illustrated in FIG. 11, the capacitor Δ43 is connected in parallel to the capacitor 43, and the capacitor Δ44 is connected in parallel to the capacitor 44.

In this circuit, the capacitors 41 and Δ41 connected in parallel corresponds to the capacitor 31 described in the first embodiment. In a similar manner, the capacitors 42 and Δ42 connected in parallel, the capacitors 43 and Δ43 connected in parallel, and the capacitors 44 and Δ44 connected in parallel correspond, respectively, to the capacitors 32, 33, and 34 described in the first embodiment. Then, as described in the first embodiment, the respective values are set so as to match the ratio of the capacitance Cpp produced between the passive electrodes 12 and 22 to the capacitance Caa produced between the active electrodes 11 and 21.

Of the capacitors 41 and Δ41 connected in parallel and corresponding to the capacitor 31, the capacitor 41 is a parasitic capacitance. Therefore, the capacitance of the capacitor Δ41 is formed by the capacitance of an actual element, and is determined as appropriate in accordance with the capacitance of the capacitor 41. In a similar manner, the capacitances of the capacitors Δ42, Δ43, and Δ44 are each formed by the capacitance of an actual element, and are determined as appropriate in accordance with the capacitances of the capacitors 42, 43, and 44, which are parasitic capacitances. Then, as the capacitors Δ41, Δ42, Δ43, and Δ44 of the capacitances determined as appropriate are connected, the equilibrium condition in the expression (5) or the expression (13) is satisfied, and the reference potential in the power reception apparatus 203 can be brought to the earth potential, which is the reference potential of the power reception apparatus 203.

It is to be noted that openings may be formed in the shield electrodes 13A and 23A and parasitic capacitances produced between the shield electrodes 13A and 23A and the active electrodes 11 and 21 and between the shield electrodes 13A and 23A and the passive electrodes 12 and 22 may be adjusted.

Figure 12:
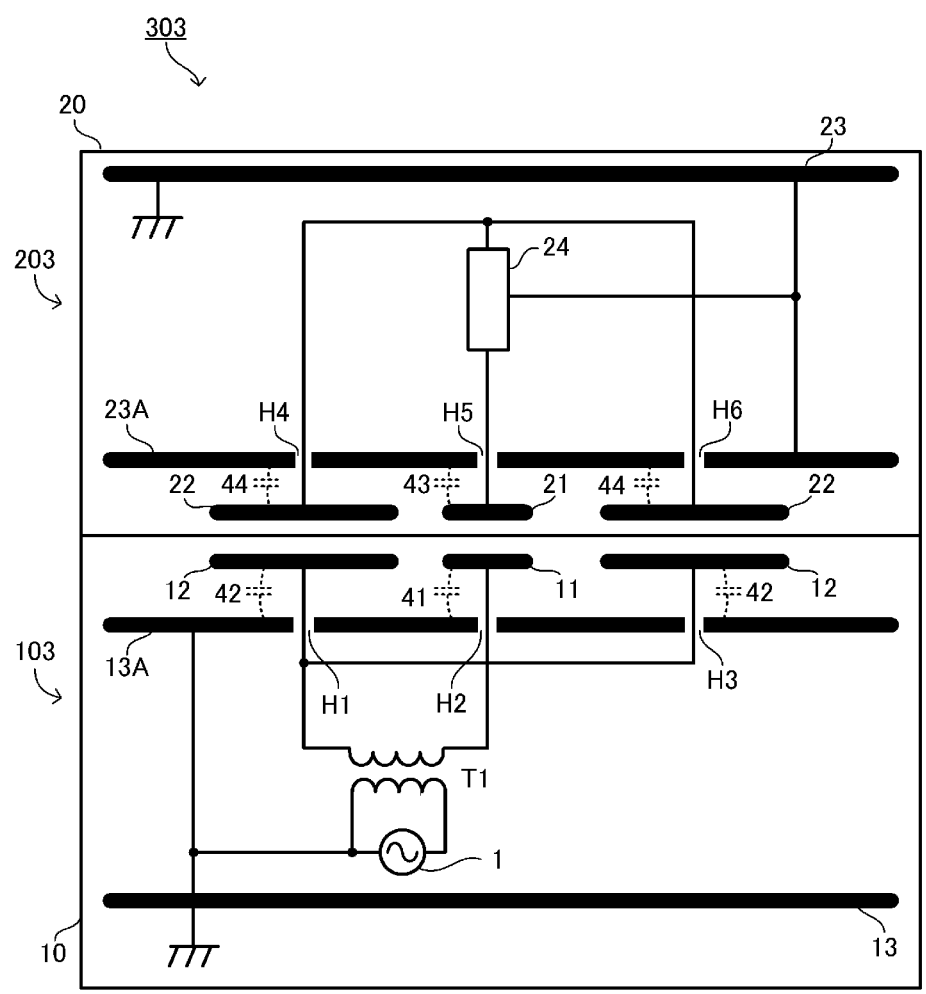
FIG. 12 is a sectional view conceptually illustrating primary portions of a power transmission apparatus and a power reception apparatus that constitute a wireless power transmission system in a case in which a parasitic capacitance is to be adjusted.

FIG. 12 is a sectional view conceptually illustrating primary portions of the power transmission apparatus and the power reception apparatus that constitute the wireless power transmission system 303 in a case in which a parasitic capacitance is to be adjusted.

In this example, openings H1, H2, and H3 are formed in the shield electrode 13A, and wires that connect the active electrode 11 and the passive electrode 12 are passed through the openings H1, H2, and H3. In addition, openings H4, H5, and H6 are formed in the shield electrode 23A, and wires that connect the active electrode 21 and the passive electrode 22 are passed through the openings H4, H5, and H6.

With this configuration, the areas over which the shield electrodes 13A and 23A face the active electrodes 11 and 21 and the passive electrodes 12 and 22 are reduced by the amount corresponding to the areas of the openings formed in the shield electrodes 13A and 23A, and parasitic capacitances produced between the electrodes are reduced accordingly. In other words, as the openings are formed in the shield electrodes 13A and 23A, the capacitances of the capacitors 41, 42, 43, and 44 can be adjusted. Thus, by increasing or reducing the diameters of the openings, the equilibrium condition in the expression (5) or the expression (13) can be satisfied in some cases without the capacitors Δ41, Δ42, Δ43, and Δ44 being provided.

In addition, as the wires are passed through the openings H1 through H6, parasitic capacitances may be produced in some cases between the wires and the shield electrodes 13A and 23A. In this case, with these parasitic capacitances taken into consideration as well, the capacitances of the capacitors 41, 42, 43, and 44 may be adjusted. In addition, with parasitic capacitances produced in the power transmission apparatus 103 and the power reception apparatus 203 taken into consideration, the capacitances of the capacitors 41, 42, 43, and 44 may be adjusted.

It is to be noted that, as illustrated in FIG. 10, even in a case in which an opening for passing a wire therethrough is not formed, wires connected to the active electrodes 11 and 21 and the passive electrodes 12 and 22 may be passed in the vicinity of the shield electrodes 13A and 23A. In addition, in the configuration illustrated in FIG. 12, the capacitances may be adjusted by further providing the capacitors Δ41, Δ42, Δ43, and Δ44 that are formed by capacitances of actual elements, as illustrated in FIG. 10.

Furthermore, regardless of the wires, openings may be formed in the shield electrodes 13A and 23A at positions different from the positions where the wires pass, in order to adjust the parasitic capacitances.

REFERENCE SIGNS LIST

1 HIGH-FREQUENCY VOLTAGE GENERATING CIRCUIT (FEEDER CIRCUIT)
11, 21 ACTIVE ELECTRODES
12, 22 PASSIVE ELECTRODES
13, 23 SHIELD ELECTRODES
25 DC-DC CONVERTER
31, 41 CAPACITORS (FIRST REACTANCE ELEMENTS)
32, 42 CAPACITORS (SECOND REACTANCE ELEMENTS)

33, 43 CAPACITORS (THIRD REACTANCE ELEMENTS)
34 CAPACITOR (FOURTH REACTANCE ELEMENT, VARIABLE REACTANCE ELEMENT)
44 CAPACITOR (FOURTH REACTANCE ELEMENT)
35 INDUCTOR (THIRD REACTANCE ELEMENT)
36 INDUCTOR (FOURTH REACTANCE ELEMENT)
Δ41, Δ42, Δ43, Δ44 CAPACITORS
101, 102, 103 POWER TRANSMISSION APPARATUSES
201, 202, 203 POWER RECEPTION APPARATUSES
301, 302, 303 WIRELESS POWER TRANSMISSION SYSTEMS
T1 STEP-UP TRANSFORMER (FEEDER CIRCUIT)
T2 STEP-DOWN TRANSFORMER
RL LOAD CIRCUIT
Cs1, Cs2 CAPACITORS
$L_{leak}$ LEAKAGE INDUCTANCE
LL INDUCTOR
D1, D2 DIODES

The invention claimed is:

1. A wireless power transmission system, comprising:
a power transmission apparatus configured to supply an alternating current voltage across a first electrode and a second electrode from a feeder circuit, the power transmission apparatus including:
   a first reactance element with a reactance X1, the first reactance element having a first end coupled to the first electrode and a second end coupled to a reference potential of the power transmission apparatus, and
   a second reactance element with a reactance X2, the second reactance element having a first end coupled to the second electrode and a second end coupled to the reference potential of the power transmission apparatus; and
a power reception apparatus configured to apply to a load circuit an alternating current voltage produced between a third electrode facing the first electrode and a fourth electrode facing the second electrode, the power reception apparatus including:
   a third reactance element with a reactance X3, the third reactance element having a first end coupled to the third electrode and a second end coupled to a reference potential of the power reception apparatus, and
   a fourth reactance element with a reactance X4, the fourth reactance element having a first end coupled to the fourth electrode and a second end coupled to the reference potential of the power reception apparatus, and
wherein, when Caa represents a capacitance produced between the first electrode and the third electrode, Cpp represents a capacitance produced between the second electrode and the fourth electrode, and
wherein the first, second, third and fourth electrodes and the first, second, third and fourth reactance elements are configured such that Cpp/Caa=X1/X2=X3/X4 and Cpp≥Caa.

2. The wireless power transmission system according to claim 1, Cpp/Caa=X1/X2=X3/X4 and Cpp≥Caa are satisfied at a fundamental frequency of the alternating current voltage.

3. The wireless power transmission system according to claim 1, wherein the feeder circuit is disposed between the first electrode and the second electrode in the power transmission apparatus.

4. The wireless power transmission system according to claim 3, wherein the power transmission apparatus further includes a shield electrode coupled to the reference potential.

5. The wireless power transmission system according to claim 4, wherein the second end of the first reactance element and the second end of the second reactance element are coupled to the shield electrode.

6. The wireless power transmission system according to claim 1, wherein the load circuit is disposed between the third electrode and the fourth electrode in the power reception apparatus, and the power reception apparatus includes a shield electrode coupled to the reference potential.

7. The wireless power transmission system according to claim 6, wherein the second end of the third reactance element and the second end of the fourth reactance element are coupled to the shield electrode.

8. The wireless power transmission system according to claim 1, wherein at least one of the first reactance element, the second reactance element, the third reactance element, and the fourth reactance element includes a variable reactance element.

9. The wireless power transmission system according to claim 1, wherein each of the first and second reactance elements are capacitors and the reference potential is ground.

10. The wireless power transmission system according to claim 9, wherein each of the third and fourth reactance elements are capacitors and the reference potential is ground.

11. The wireless power transmission system according to claim 9, wherein each of the third and fourth reactance elements are inductors coupled in series between the third and fourth electrodes and the reference potential is ground.

12. The wireless power transmission system according to claim 1, wherein each of the first and second reactance elements are parasitic capacitances.

13. The wireless power transmission system according to claim 12, wherein each of the third and fourth reactance elements are parasitic capacitances.

14. The wireless power transmission system according to claim 1, wherein the power transmission apparatus further comprises a step-up transformer configured to boost the alternating current voltage across the first and second electrodes.

15. The wireless power transmission system according to claim 14, wherein a leakage inductance $L_{leak}$ of the step-up transformer forms a resonance circuit with a parasitic capacitance produced between the first and second electrodes.

16. The wireless power transmission system according to claim 15, wherein a resonant frequency of a combined capacitance of the first and second reactance elements, the parasitic capacitance, and the leakage inductance $L_{leak}$ of the step-up transformer is set to a frequency of the alternating current voltage generated by the feeder circuit.

17. The wireless power transmission system according to claim 14, wherein the power reception apparatus further comprises a step-down transformer configured to step down the alternating current voltage across the third and fourth electrodes.

18. The wireless power transmission system according to claim 17, wherein a primary coil of the step-down transformer forms a resonance circuit with a parasitic capacitance produced between the third and fourth electrodes.

19. The wireless power transmission system according to claim 1, wherein the first and second electrodes are disposed in a same plane of a housing of the power transmission apparatus and the second electrode encloses the first electrode with a space therebetween.

20. The wireless power transmission system according to claim 19, wherein the power transmission apparatus further includes a shield electrode disposed in the housing and facing the first and second electrodes to provide a shield between the first and second electrodes and ground.

* * * * *